Oct. 12, 1926.  
A. K. MALMQUIST  
1,603,132  
CANNING APPARATUS  
Original Filed August 18, 1922   6 Sheets-Sheet 1
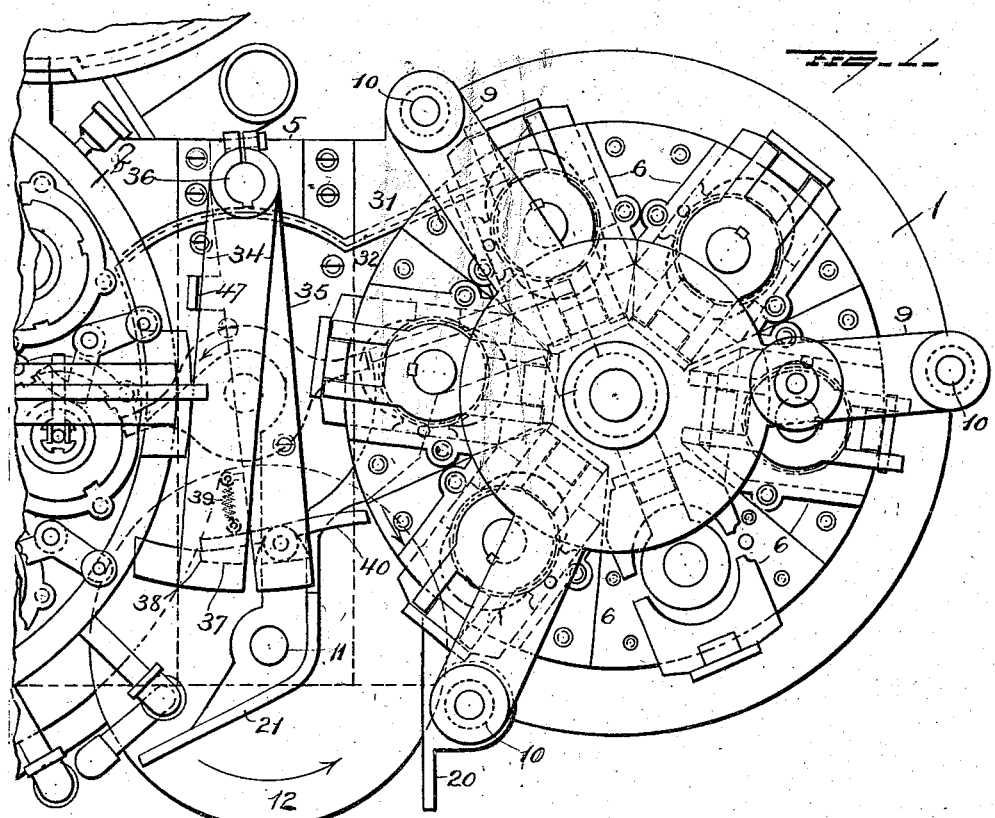
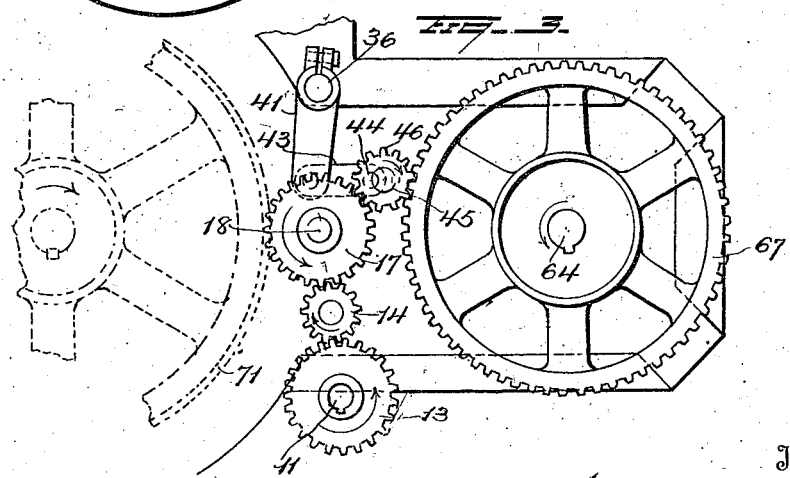
Inventor  
A. K. Malmquist  
By Seymour & Bright  
Attorneys

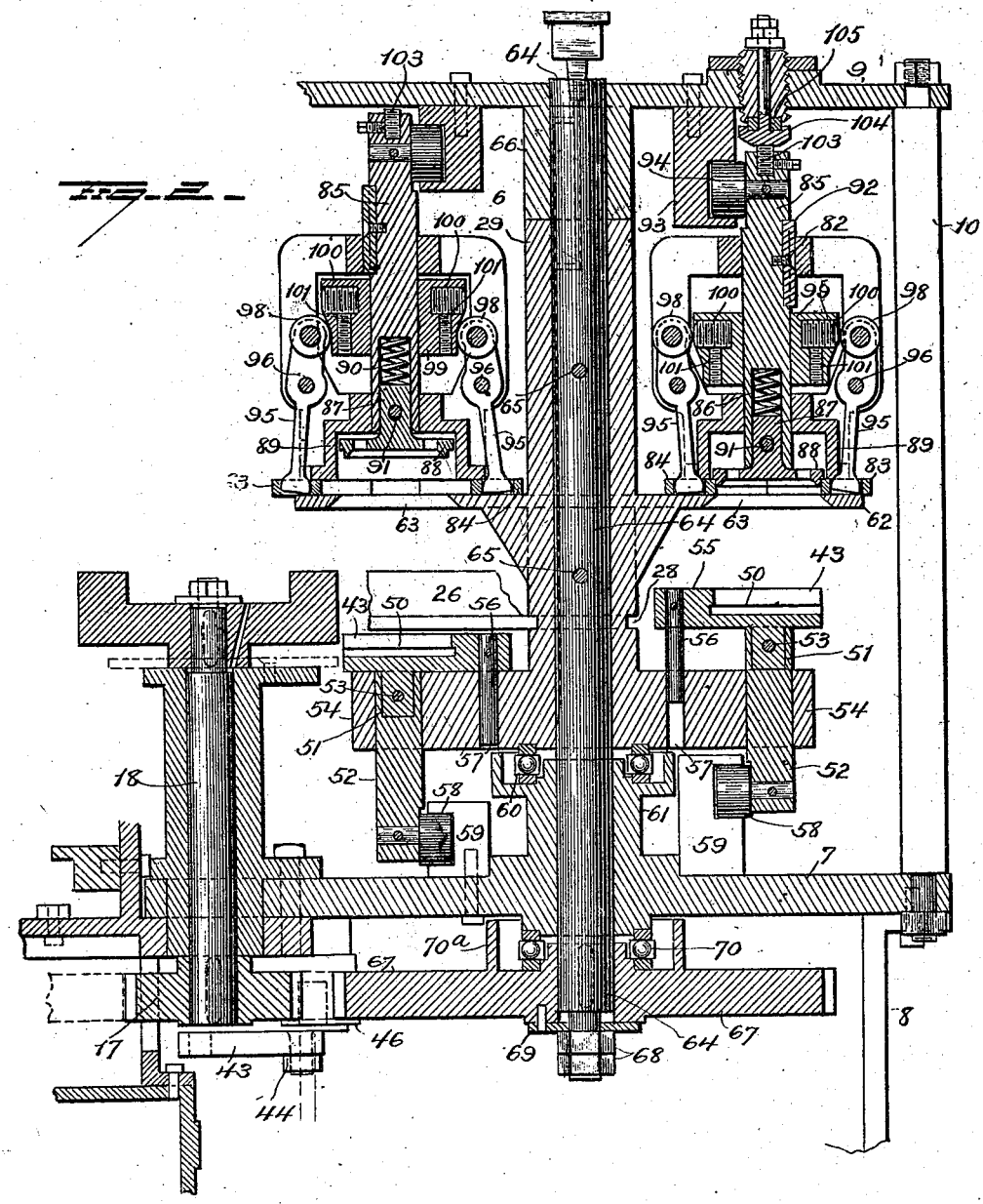

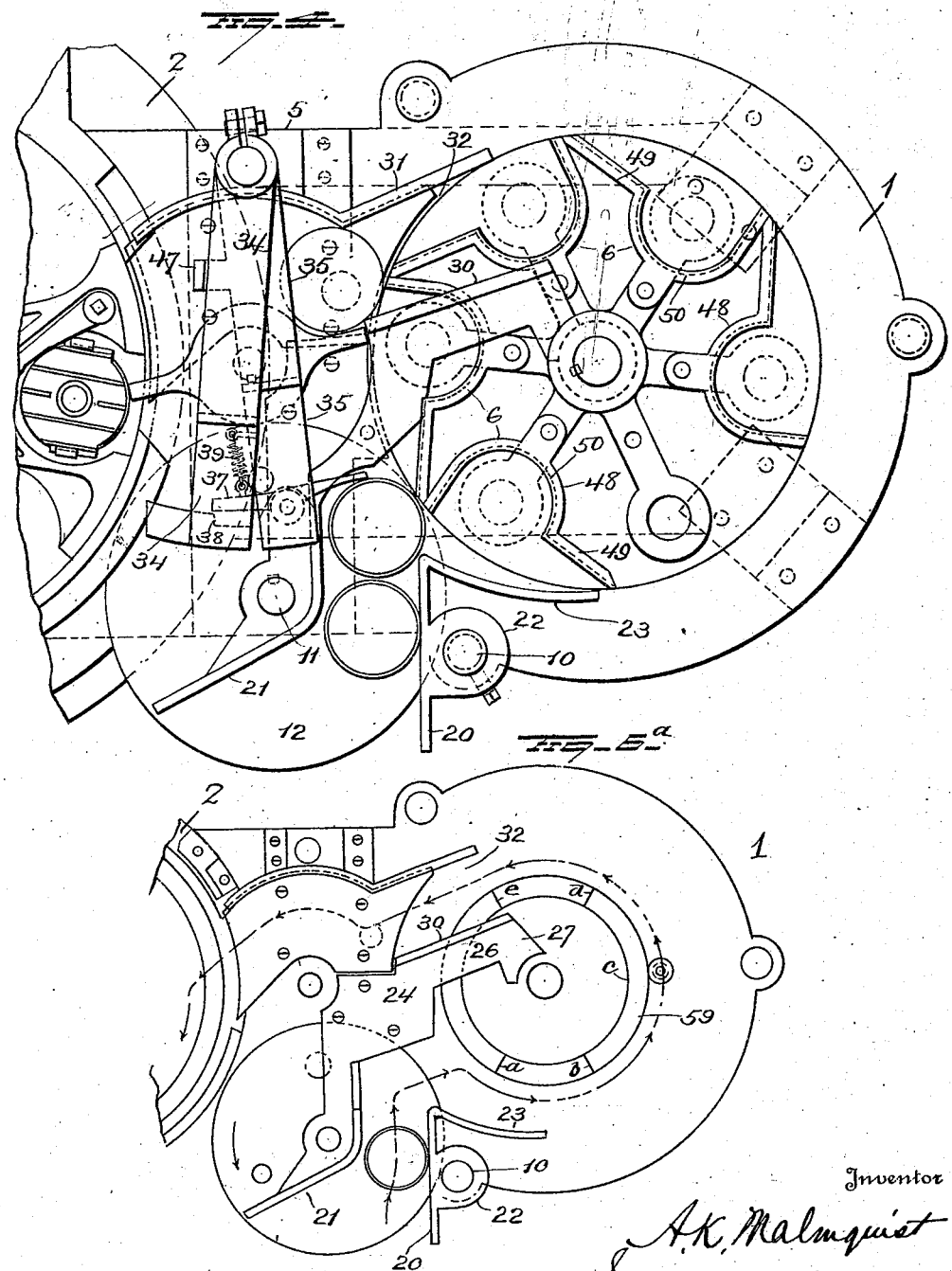

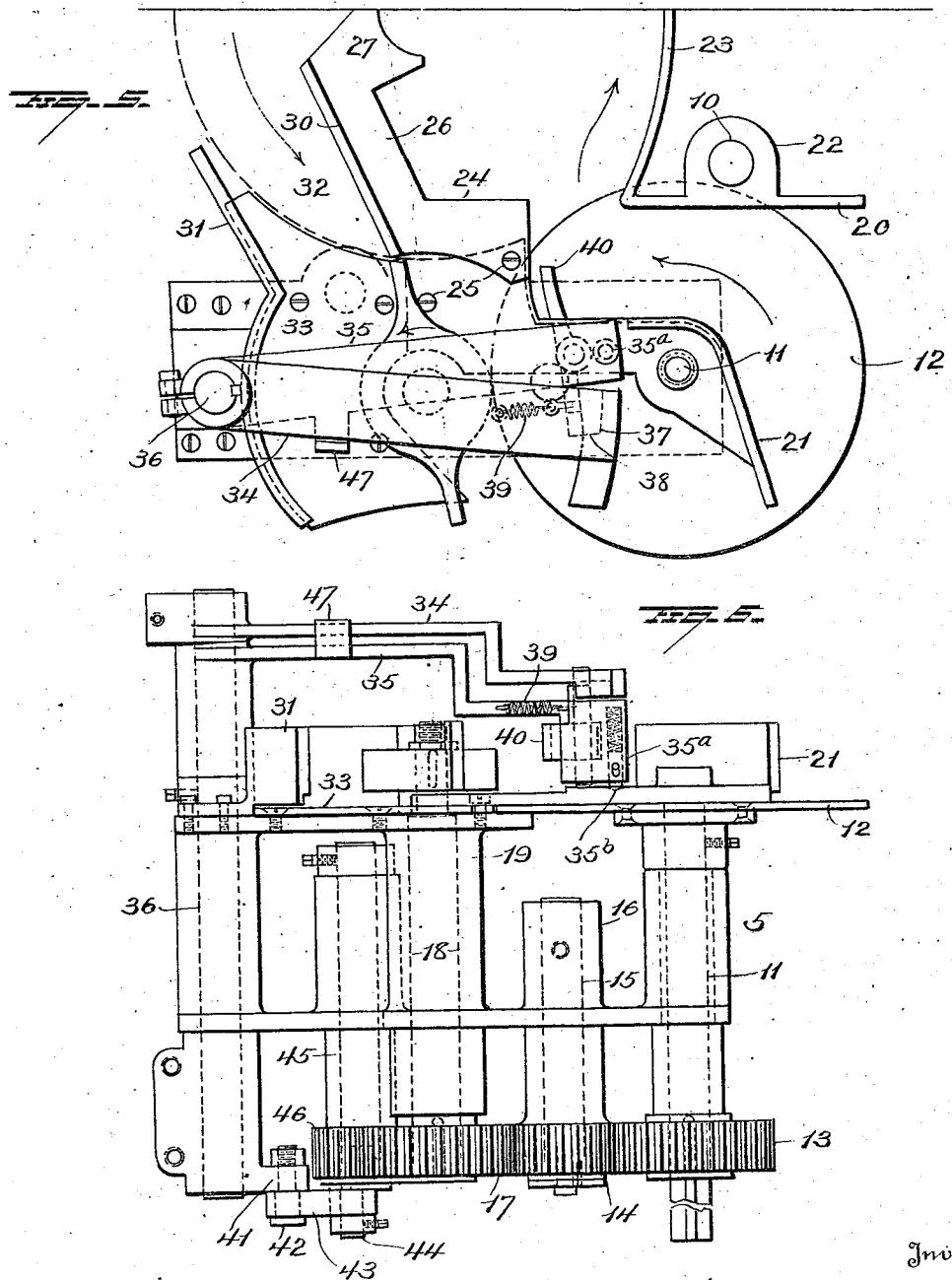

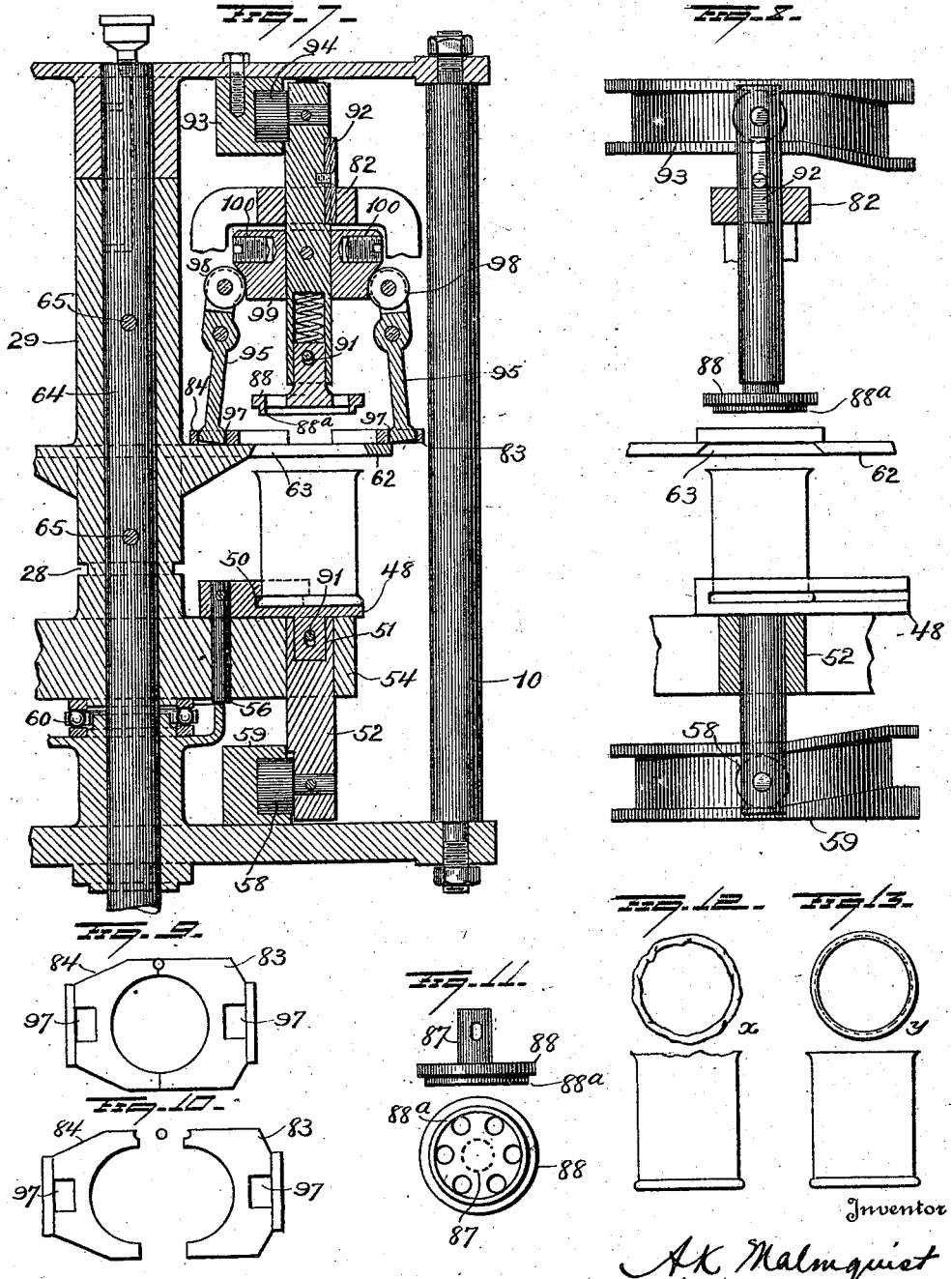

Oct. 12, 1926.
A. K. MALMQUIST
1,603,132
CANNING APPARATUS
Original Filed August 18, 1922   6 Sheets-Sheet 6
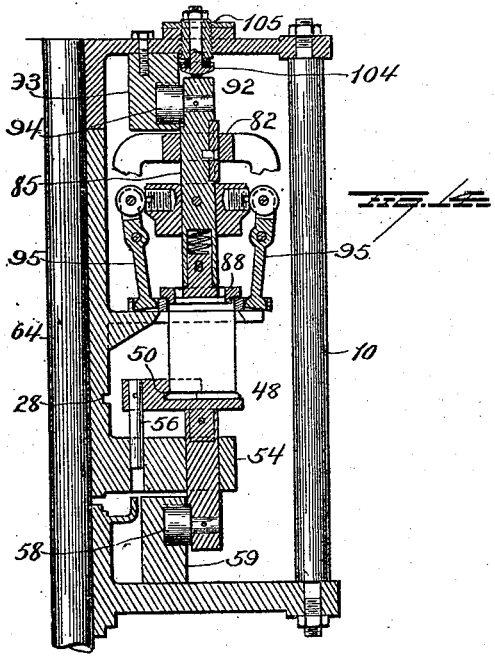
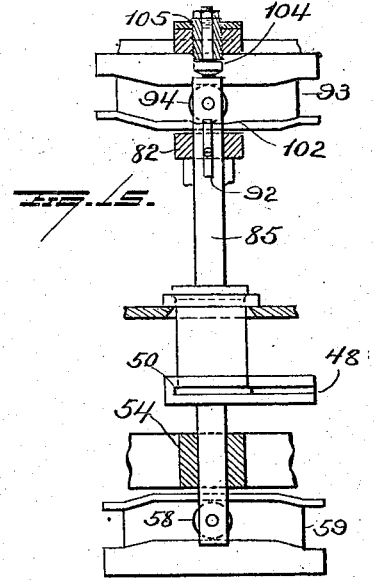
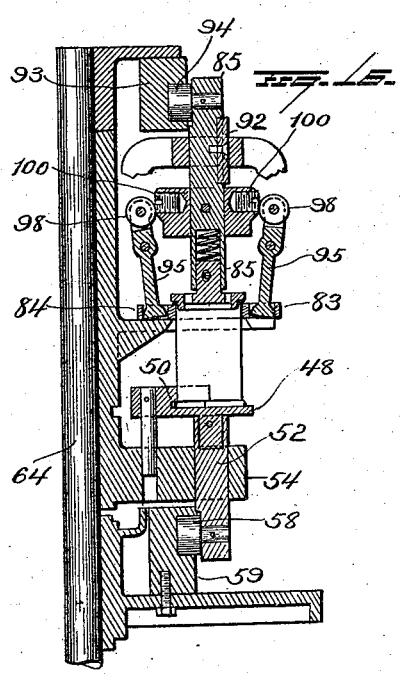
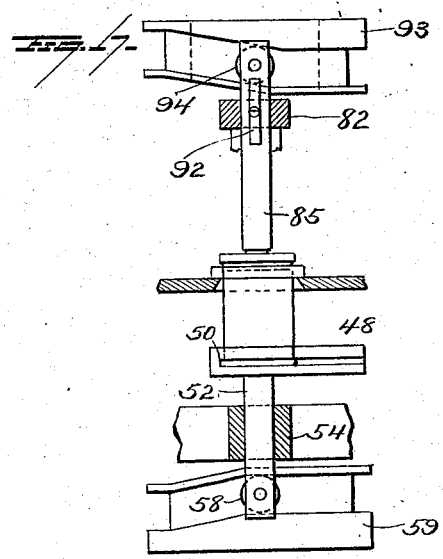
Inventor
A. K. Malmquist
By Seymour & Bright
Attorneys Patented Oct. 12, 1926.

1,603,132

UNITED STATES PATENT OFFICE.

ADOLPH K. MALMQUIST, OF SOUTH BELLINGHAM, WASHINGTON, ASSIGNOR TO MALMQUIST MACHINE COMPANY, OF SOUTH BELLINGHAM, WASHINGTON.

CANNING APPARATUS.

Original application filed August 18, 1922, Serial No. 582,712. Divided and this application filed August 26, 1924. Serial No. 734,223.

This invention relates to improvements in canning apparatus,—the same being a division of my application filed August 18th, 1922, and designated by Serial No. 582,712.

Heretofore, difficulty has been experienced in satisfactorily filling and sealing cans in vacuum on account of imperfections in the open flanged portion of some of the cans. In order to obtain good results, the open end portion of cans and their flanges must be correct and regular, otherwise good results cannot be obtained. A dented or irregular can flange will not seat properly and accurately on a pad under the filling valve, the can will leak and will not be uniformly filled with liquid, and when the cap or cover is afterwards seamed to a dented can flange, the cement or paper lining used in the cap as a packing in the seam, will be spoiled by sharp pointed dents on the flange of the can, such pointed dents causing the packing to be cut while the finished can might seem from external appearance to have been perfectly sealed, but it will leak to a greater or less extent. The leak might be very small, but it will become enlarged in the final cooking operation and may (in the event of a very small leak) become closed when the can cools. The can might then be tight but the vacuous condition therein will have become destroyed and the contents of the can will not be preserved as well as it would if all the cans be perfectly sealed before leaving the vacuous seaming chamber.

An object of my present invention is to provide means which shall be operable automatically to insure the correct and accurate formation of the open ends of the cans and their flanges before they are applied to filling means.

With this other objects in view, the invention consists in certain novel features of construction and combinations of parts as hereinafter set forth and pointed out in the claims.

In the accompanying drawings;

Figure 1 is a plan view;

Figure 2 is a sectional view;

Figure 3 is a view illustrating the gearing;

Figure 4 is a horizontal sectional view;

Figures 5 and 6 are detail views in plan and elevation respectively illustrating parts of the can feeding mechanism;

Figure 6ª is a diagrammatical view;

Figure 7 is a sectional view showing one of the units of the mechanism with the jaws open and the flanging head in retracted positions;

Figure 8 is a view partly in section taken at right angles to Figure 7;

Figures 9, 10 and 11 are views of certain details;

Figure 12 is a view of a can having an imperfect flanged portion;

Figure 13 is a view of a can after it shall have been operated upon by the flange-perfecting mechanism, and Figures 14, and 15 and 16 and 17 are views illustrating different positions assumed by parts of the mechanism.

The framework of the machines includes a table 5 illustrated in detail in Figures 5 and 6 and in proximity to the table, the can perfecting or shaping mechanism is located and comprises a plurality of units 6 (six units being employed in the embodiment of the invention shown in the drawing as indicated in Figures 1 and 4) so that cans fed to said mechanism successively may be operated upon during the continuous operation of said mechanism.

The supporting means for the mechanism includes a base bracket 7 supported on legs, such as shown at 8 Figure 2. The supporting means also includes an upper bracket 9 supported above the lower bracket 7 by posts 10.

The can feed table has mounted therein, a vertical shaft 11 (Fig. 6), to the upper portion of which, a horizontal can feed disk 12 is secured, and to the lower end of said shaft a gear 13 is secured and receives motion constantly from an idle gear 14 secured to a shaft 15 supported by a sleeve 16 forming part of the table structure 5,—said idle gear being driven by a gear 17 carried by a shaft 18 mounted to rotate in a bearing sleeve 19 forming part of the table structure 5. The gear 17 is constantly driven, and thus motion is transmitted to the can feed disk 12 to continuously rotate the same.

Open cans which may contain solid food may be delivered by any suitable means (not shown) to the revolving feed disk and the cans will be carried by said disk between guides 20, 21 disposed over the disk. The guide 20 is provided with a boss 22 secured to one of the posts 10 and at one end of the guide 20, a curved guide 23 is provided. The guide 21 is made rigid with a plate 24 (Fig. 5) having a part near the guide 21 through which the shank at the upper end of the shaft 11 passes. The plate 24 is secured to the table structure 5 as shown at 25 and projects into the structure of the can perfecting mechanism as indicated at 26, and said mechanism will operate to shape an imperfect feed can such as shown at $x$ Fig. 12 so that it will appear as shown at $y$ Fig. 13. The part 26 of the plate 24 is made with a lateral arm 27 which enters a groove 28 (Fig. 2) in a central tubular column of a spider 29 in said can-perfecting structure. At one end, part 26 of the plate 24 is provided with a guide flange 30 spaced from the straight portion of a guide 31 to form a guideway 32, and said guide 31 is provided with a plate member 33 secured to the table structure 5, as shown in Figures 5 and 6.

The rotating disk will operate to move a can in front of superimposed levers 34 and 35 carried by a vertical shaft 36 mounted in the table structure 5,—the lever 34 being fixed to said shaft and the lever 35 being mounted loosely thereon. A latch 37 is mounted on the loose lever 35 and is normally maintained out of latched engagement with a shouldered portion 38 of the lever 34, by the action of a spring 39,—said latch being provided with a lever or trip arm 40 disposed in the path of a can on the rotating feed disk 12. To the lower end portion of the shaft 36, a crank arm 41 is secured and carries a pin 42 which is connected by a link 43 with an eccentric 44 carried by the lower end of a vertical shaft 45 mounted in the table structure 5,—said shaft being provided at its lower end with a gear 46 which receives motion from the gear 17 (see Figures 3 and 6). With such construction the shaft 36 will be oscillated continuously, the upper lever 34 moving back-and-forth over the can path while the lower loose lever 35 will remain normally at rest. When a can is fed forward by the constantly rotating feed disk 12, said can will engage the latch lever 40 and the two levers will become latched together so that the lower lever 30 will move forwardly with the upper lever 34 and feed the can to the can-perfecting mechanism. When this shall have been accomplished, the spring 39 will operate to disconnect said levers, and as the upper lever 34 recedes it will engage an arm 47 on the loose lever 35 and cause the latter to be returned to its normal idle position. In order to prevent the lever 34 from dragging lever 35 until a can couples lever 34 with latch lever 40, the lever 35 is provided with a spring-pressed holding pin 35$^a$ having a rounded lower end to engage in a depression 35$^b$ in the underlying plate as shown in Figure 6.

When a can is moved into the can-perfecting mechanism as above described, it will become deposited upon one of a series of can supporting platforms or pockets 48, each of which is made with a lateral extension 49 to facilitate the subsequent discharge of the can and each of said platforms or pockets is made with a groove 50 for the accommodation of the bottom flange of a can, as shown in Figures 4, 7, 8 and 14 to 17. The platforms or pockets 48 are provided with depending shanks 51 entering sockets in the upper ends of plungers 52 and pinned to the latter, as at 53. The plungers 52 are vertically movable through suitable holes in arms 54 on the spider 29, and each platform or pocket 48 is made with an extension 55 which carries a guide rod 56 entering a hole 57 in one of the spider arms 54. Each plunger 52 carries near its lower end, a roller 58 to cooperate with a grooved cam 59 secured to the lower fixed bracket 7, for raising and lowering the platforms or pockets and the can thereon relatively to the devices located above the same which operate to straighten or perfect the open flanged upper ends of the cans.

The can raising and lowering devices and the straightening or perfecting devices above referred to constitute one of the units 6 of the can perfecting mechanism, and in the apparatus illustrated in the drawings, six such units are employed, and the movable parts of each of said units are carried by the spider 29. The spider 29 is rotatably supported on ball bearings 60 disposed in the cupped upper end of an enlargement 61 on the lower fixed bracket 7 and, in addition to the radial arms 54, said spider is provided with a horizontal plate or bracket member 62 located above the said arms and provided with openings 63 for the accommodation of the upper ends of cans when the same are raised by the raising of the can platforms or pockets 48. A driving shaft 64 for the spider 29 passes through the central tubular portion of the latter and is pinned to the same as indicated at 65,—the upper portion of said shaft being mounted in a bearing 66 depending from the upper bracket 9. The lower portion of the shaft passes through the enlargement 61 on the lower bracket 7 and a gear 67 is keyed to its depending end and provided with a thread shank which receive holding nuts 68 and an interposed washer 69,—ball bearings 70 being interposed between said gear and the lower bracket 7 and enclosed by a flange 70<sup>a</sup> on said gear. The gear 67 is driven, through the medium of the gears 46 and 17 from a large gear 71 and the latter is driven through the medium of suitable gearing from a driving shaft, not shown.

The devices for straightening or shaping the flanged open ends of the cans comprise (in each unit 6) a yoke or frame 82 mounted upon and movable with the spider plate 62, and serves as a holder for dies 83, 84 Figs. 9 and 10, disposed over said spider plate adjacent to opening 63 therein. The yoke or frame 82 also serves as a carrier for a vertically movable punch spindle 85 having in its lower end, a socket 86 which receives the shank 87 of a flanging punch head 88 which is movable in the lower portion 89 of the yoke or frame 82 as shown in Figure 2. A spring 90 in the socket 86 serves to permit the punch head to yield and movement of said punch head relatively to the spindle is limited by the pin-and-slot connection indicated at 91. The spindle 85 is prevented from rotation relatively to the yoke or frame 82 by means of a spline 92 and said spindle and the punch head carried thereby are caused to move vertically when the spider 29 is rotated, by the action of a cam 93 secured to the fixed top bracket 9,—said spindle 85 being provided with a roller 94 to cooperate with said cam. Levers 95, 95, are pivotally mounted between their ends, as at 96 in diametrically opposite side portions of the yoke or frame (the latter being slotted for this purpose) and their lower ends engage in openings or sockets 97 with which the jaws 83 and 84 are provided. The upper arms of said levers 95 are provided with rollers 98 which cooperate with a cam cone 99 pinned to the spindle 85, so that when said spindle is caused by the cam 93 to move downwardly, the levers 95 will be operated to cause the jaws or dies 83, 84 to move toward each other for engaging the open upper portion of a can when the same is positioned between them. In order that the extent of inward movement of the jaws or dies may be adjusted, the cam cone with which the rollers on the levers cooperate is provided with adjustable threaded members or screws 100 to be engaged by the rollers 98 and these screws may be held at any desired adjustment by means of set screws 101, as shown in Figure 2.

When a can shall have reached one of the platforms or pockets 48 of one of the can perfecting units 6, the parts of said unit will be in the position indicated in Figures 7 and 8. As the spider 29 rotates and the roller 58 travels from the point $a$ to the point $b$ (Fig. 6<sup>a</sup>) of the cam 59, the platform or pocket 48 will be raised so that the upper flanged end of the can will be projected through one of the openings 63 of the spider plate 62 and about one-eighth of an inch above the plane of the jaws or dies 83—84. During the same extent of travel of the unit 6, cooperation of the roller 94 with the upper cam 93, will cause the spindle 85 and hence the punch head 88 to descend and its circular flange 88<sup>a</sup> to enter the open upper end of the can. The same downward movement of the spindle will cause the cam cone 99 to descend and, through the medium of the levers 95, to move the jaws or dies toward each other and engage the upper edge portion of the can. The positions of the parts will then be as indicated in Figures 16 and 17. The raising of the can sufficiently to cause its flanged upper end to project slightly above the plane of the dies is of importance because the flanges of some cans are badly bent and if not raised above the plane of the dies, the latter might catch the flange and fail properly to clear the same as the spider rotates carrying the can with it to point $c$, Figure 6<sup>a</sup>. When point $c$ is reached, the roller 58 will have entered a depressed portion 102 of the cam 59 (Fig. 15) and the can will then hang on the dies and the flange of the can may be shaped without changing the height of the can. During the travel of the parts from the point $b$ Fig. 6<sup>a</sup> to the point $c$, roller 94 cooperating with the cam 93, will cause the spindle 85, cone 99 and punch head 88 to move downwardly and effect the closing of the dies around the can and the punch head to force the can down. When the point $c$ (Fig. 6<sup>a</sup>) shall have been reached, the punch head will have been moved down tightly against the can flange and the latter will have been straightened or its shape perfected. In order that the can flange may be kept straight or properly shaped, it is important that the punch be given a sudden hammer blow, otherwise the can flange might spring back to its original shape after having been released from the action of the punch and dies. To accomplish such a blow being imparted to the punch when the can reaches the point $c$ (Fig. 6<sup>a</sup>) and the parts approach the positions shown in Figures 14 and 15, an adjustable screw 103 (Fig. 2) projecting from the upper end of the spindle 85 will engage a cam 104 adjustably secured to the top bracket 9 and made yielding by means of a rubber pad 105. By permitting the cam 104 to yield slightly when it is engaged by the screw in the upper end of the spindle 85, slight inequalities in the thickness of the tin of the can flange or the presence of solder may be compensated for without damage to the tin of the flange. The upper, open flanged end of the can having now been straightened or perfected in shape, the jaws or dies and the flange punch will recede and the can will descend with the descent of the can carrying platform 48 during the travel of the unit 6 from the point $d$ to the point $e$, Figure 6ª, and the perfected can is ready to be transferred to the mechanism 2 wherein the filling of the can with liquid, such as syrup, is effected, and in the meantime, other cans have been perfected in the mechanism 1 as the spider 29 thereof continues to rotate.

The cans will pass from the perfecting mechanism through guideway 32 to other mechanism, such as liquid filling mechanism shown and described in my application hereinbefore identified.

Having fully described my invention what I claim as new and desire to secure by Letters-Patent, is:—

1. In apparatus of the character described, the combination with framework and a rotating spider, of a plurality of can shape perfecting mechanisms carried by said spider, each of said mechanisms comprising a vertically movable can support, a vertically movable plunger over said support, a yielding punch head carried by said plunger, relatively movable dies to engage a can, levers engaging said dies, and means carried by the plunger for operating said levers, means for reciprocating said can supports and means for reciprocating said plunger.

2. In apparatus of the character described, the combination with framework, of a horizontally movable member having an opening therein, a vertically movable can support carried by said member, means for reciprocating said can support, a vertically movable plunger over said can support, a yielding punch head carried by said plunger, horizontally disposed relatively movable dies mounted on said member to receive the upper portion of a can between them, pivoted levers engaging said dies, a cam cone secured to said plunger for operating said levers to operate the dies, and means for reciprocating said plunger.

3. In apparatus of the character described, the combination with framework, of a horizontally movable member having an opening, relatively movable horizontal dies carried by said member adjacent to the opening therein, means for moving said dies relative to a can, reciprocating means for raising and lowering the can, a vertically movable plunger, a punch head carried by the lower portion of said plunger, means for reciprocating said plunger, said dies and punch head being operable to perfect the shape of the flanged upper portion of a can, and a part carried by the frame-work to be engaged by the upper end of said plunger whereby a blow will be imparted to the latter.

4. In apparatus of the character described, the combination with framework, of a horizontally movable member having an opening, relatively movable horizontal dies carried by said member adjacent to the opening therein, means for moving said dies relative to a can, reciprocating means for raising and lowering the can, a vertically movable plunger, a punch head carried by the lower portion of said plunger, means for reciprocating said plunger, said dies and punch head being operable to perfect the shape of the flanged upper portion of a can, and a cushioned device carried by the framework to be engaged by the upper end of said plunger whereby a blow will be imparted to the latter.

5. In apparatus of the character described, the combination with can shape-perfecting mechanism, and a continuously rotating feed disk, of a horizontally disposed lever, means for continuously oscillating said lever, a loosely mounted feed lever adjacent to said first-mentioned lever, and means operable by a can on the rotating feed disk to lock said levers together whereby the feed lever will be operated to move a can into the can shape-perfecting mechanism.

6. In apparatus of the character described, the combination with framework, can shape-perfecting mechanism, and a continuously rotating feed disk, of a horizontally disposed lever, means for continuously oscillating said lever, a loosely mounted feed lever, a latch for connecting said levers, a spring normally retracting said latch, and a lever for said latch to be engaged by cans on said rotating feed disk to latch said levers together, whereby said feed lever will move a can from said feed disk and into the can shape-perfecting mechanism.

7. In apparatus of the character described, the combination with framework, a can shape-perfecting mechanism, and a continuously rotating feed disk, of a horizontally disposed lever, means for continuously oscillating said lever, a loosely mounted feed lever, a latch for connecting said lever, a spring normally retracting said latch, a lever for said latch to be engaged by cans on rotating feed disk to latch said levers together, whereby said feed lever will move a can from said feed disk and into the can shape-perfecting mechanism, and means carried by one of said levers to be engaged by the other for retracting the loose feed lever when the oscillatory lever recedes.

8. In apparatus of the character described, the combination with framework, can shape-perfecting mechanism, and a continuously rotating feed disk, of a horizontally disposed lever, means for continuously oscillating said lever, a loosely mounted feed lever, a latch for connecting said levers, a spring normally retracting said latch, a lever for said latch to be engaged by cans on said rotating feed disk to latch said levers together, whereby said feed lever will move a can from said feed disk and into the can shape-perfecting mechanism, a spring-pressed holding pin carried by the said feed lever, and a part rigid with the framework and having a recess to receive said holding pin.

In testimony whereof, I have signed this specification.

ADOLPH K. MALMQUIST.